May 16, 1950 S. G. FALK 2,508,019

TONE ARM RETURN MECHANISM

Filed Oct. 8, 1947

S. G. FALK
INVENTOR
BY Fred M. Vogel
AGENT

Patented May 16, 1950

2,508,019

UNITED STATES PATENT OFFICE 2,508,019

TONE ARM RETURN MECHANISM

Sven Gustaf Falk, Stockholm, Sweden, assignor to Hartford National Bank and Trust Company, Hartford, Conn., trustee Application October 8, 1947, Serial No. 778,542
In Sweden June 28, 1946

Section 1, Public Law 690, August 8, 1946
Patent expires June 28, 1966

1 Claim. (Cl. 274—15)

In gramophones comprising an automatic record-changing mechanism it is required for the pick-up arm, before a record is played, to be moved into a determined initial position. This may be effected, for example, by means of a control member, which may be in the form of a rotary disc. The rotary disc may be driven by the driving mechanism for the gramophone and a control arm governed by the said control member and co-operating with the pick-up arm. In the said initial position the pick-up arm is preferably above the edge portion of the record which is not provided with grooves. From this position, the pick-up, together with its needle, is lowered on the said edge portion whereupon it is given a movement pulse guided laterally into the first groove of the record. A construction of this kind is used particularly in view of the fact that the diameter of the records to be played is not always the same.

However, in order that such a construction may give complete satisfaction, the lateral pressure against the pick-up arm brought about by the action of a spring is required to be eliminated automatically when the needle of the pick-up starts to follow the first groove of a record.

The present invention relates to a device of this kind in which the said control member includes a cam or similar device which is provided to eliminate the spring action exerted on the pick-up arm when the movement of the control member is stopped and the reproduction of a record begins. The object of the invention is to provide for this purpose a construction which is as simple and as reliable as possible.

For this purpose the device according to the invention comprises a spring, one extremity of which is secured to the housing of the device, and the free extremity of which is so arranged that, in its operative position, it engages directly with a point of the control arm, the cam being of a shape such as to be able to restore the spring to its inactive position, in which the coupling between the free extremity of the spring and the control arm is released, preferably with the interposition of a member, for example in the form of a sliding rod, which acts upon the spring.

The invention will now be explained more fully with reference to the accompanying drawing showing, by way of example, one embodiment thereof.

Figures 1, 2:
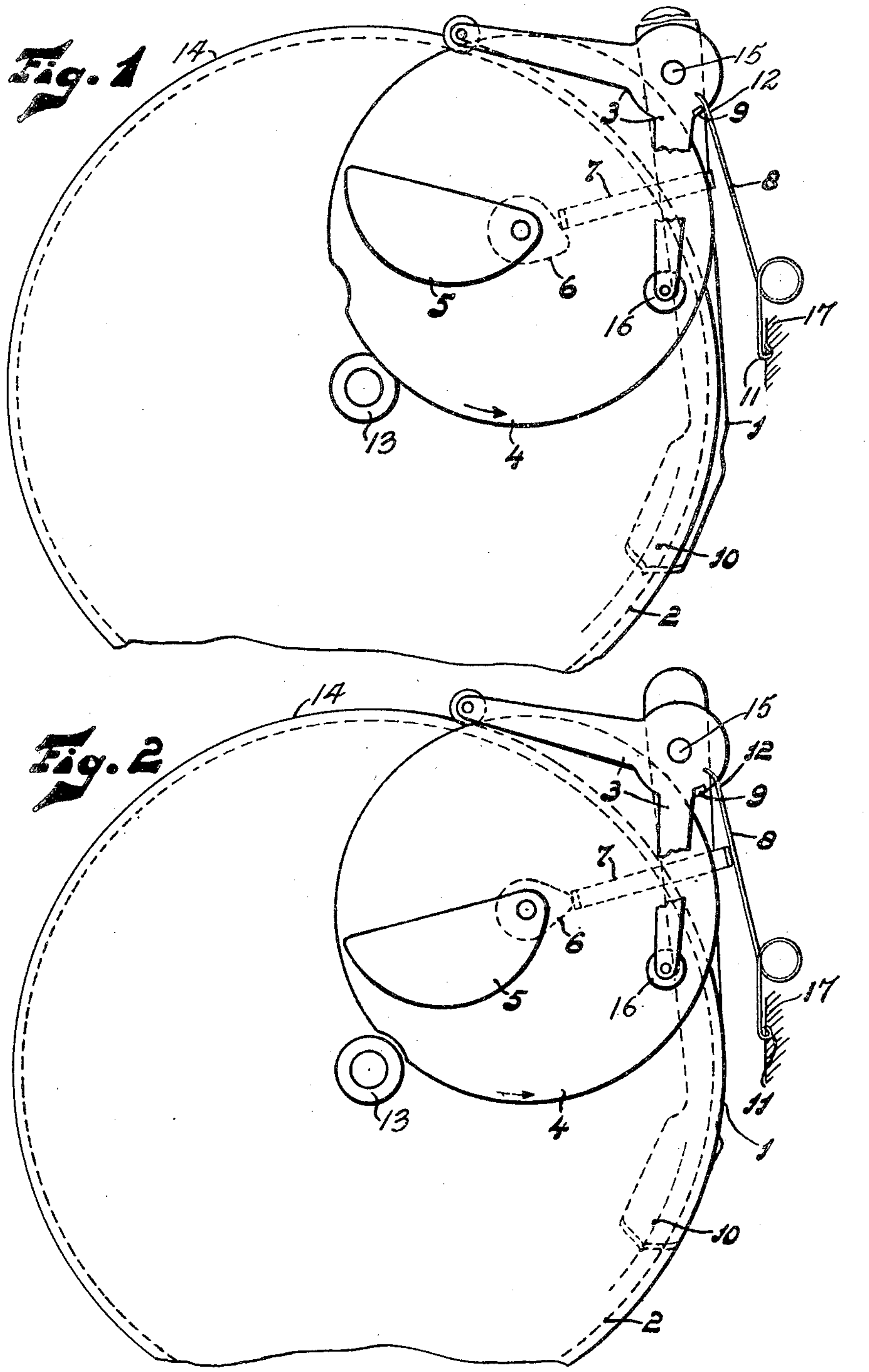
Fig. 1 is a bottom view of this device.
Fig. 2 is a view similar to Fig. 1, showing some parts adjusted in different positions.

The pick-up arm of the gramophone is shown at 1. The record 2 to be played off is indicated only by dotted lines as it is on the other side of the turnable 14 as viewed in the figures. The lateral movement of pick-up arm 1 before the reproduction of a record begins is brought about by lateral movement of a control arm 3 fixedly mounted on a same shaft 15 as is the pick-up arm 1 so that the assembly rotates as a unit. The control arm 3 is actuated by movement of a control member in the form of a disc 4, driven by the spindle 13 of the turntable 14 in the direction indicated by an arrow, when the cam 5 provided for the purpose engages the wheels 16. The disc comprises, in addition to the said cam 5, another cam 6 which, in the embodiment shown, co-operates with a member 7 in the form of a conveniently controlled sliding rod which is adapted to engage a spring 8 when in the position shown in Fig. 2. The spring 8 is secured, at 11, to the housing 17 of the device and its free extremity 12 tends to engage a projection 9 of control arm 3 and act thereupon in order to turn the control arm and hence the pick-up arm laterally inwards as indicated in Fig. 1. The object of this device is to guide the needle 10 of the pick-up 1, which is lowered on the smooth edge of the record 2 before the beginning of the reproduction, into the first groove of the record. The drawing shows in what manner the needle 10 (indicated by a dot) is moved from the smooth edge of a record as shown in Fig. 1 into the position shown in Figure 2 in which the needle is in the first groove. In the latter position the cam 6 acts upon the sliding rod 7 so that the latter disengages the spring 8 from the projection 9 (Fig. 2) with the result that the pressure of the spring is removed from the control arm 3 and the pick-up arm 1. Consequently, the needle can follow freely the groove of the record. The disc 4 is at rest during playing of the record 2 and the pick-up arm 1 is then not subject to the control brought about by the disc 4 on record changing, the operation of which wil not be described here as being not directly connected with the present invention. Upon record changing the disc 4 is set into motion again and the sliding rod 7 is allowed to return to its inactive position, so that the spring 8 can engage again the projection 9 and act thereupon and the described process of guiding the needle into the groove for the subsequent record playing may be repeated.

It is evident that the cam 6 may be shaped and arranged so as to act directly upon the spring 8, in which event the rod 7 is dispensed with.

What I claim is:

In a gramophone comprising a pick-up arm, a turntable operatively associated with said pick-up arm, said arm being adapted to be initially lowered on the ungrooved edge of the record to be played prior to playing of the record, and driving means for said turntable; a device comprising a rotary disc operatively associated with said driving means, a control arm operatively associated with said pick-up arm for lateral movement therewith, a cam operatively associated with said rotary disc for movement therewith in a path to engage a part of said control arm and move said control arm laterally in a direction away from said turntable, a second engageable part on said control arm, a resilient member mounted at one end thereof on a fixed portion of said gramophone, the other end of said resilient member being so located that in a free position said resilient member engages said second engageable part on said control arm for urging said control arm laterally in a direction toward said turntable, a second cam operatively associated with said rotary disc for movement therewith, and a sliding rod positioned for axial movement by said cam into engagement with said resilient element for disengaging said resilient element from said engageable part of said control arm.

SVEN GUSTAF FALK.

REFERENCES CITED

The following references are of record in the file of this patent:

UNITED STATES PATENTS

| Number | Name | Date |
|---|---|---|
| 1,781,617 | Waterworth | Nov. 11, 1930 |
| 1,802,152 | Marr | Apr. 21, 1931 |